United States Patent
Mahurin et al.

(10) Patent No.: US 9,377,373 B2
(45) Date of Patent: Jun. 28, 2016

(54) SYSTEM AND METHOD FOR ANALYZING VERBAL RECORDS OF DICTATION USING EXTRACTED VERBAL FEATURES

(75) Inventors: Nick Mahurin, Terre Haute, IN (US); Nathan Lindle, Terre Haute, IN (US); Markus Dickinson, Bloomington, IN (US); Sandra Kuebler, Bloomington, IN (US)

(73) Assignee: InfraWare, Inc., Terre Haute, IN (US)

( * ) Notice: Subject to any disclaimer, the term of this patent is extended or adjusted under 35 U.S.C. 154(b) by 474 days.

(21) Appl. No.: 13/877,994

(22) PCT Filed: Oct. 5, 2011

(86) PCT No.: PCT/US2011/054857
§ 371 (c)(1),
(2), (4) Date: Apr. 5, 2013

(87) PCT Pub. No.: WO2012/047955
PCT Pub. Date: Apr. 12, 2012

(65) Prior Publication Data
US 2013/0191116 A1 Jul. 25, 2013

Related U.S. Application Data

(60) Provisional application No. 61/389,836, filed on Oct. 5, 2010.

(51) Int. Cl.
*G10L 15/26* (2006.01)
*G10L 15/10* (2006.01)
(Continued)

(52) U.S. Cl.
CPC ............ *G01L 15/00* (2013.01); *G06F 17/2705* (2013.01)

(58) Field of Classification Search
CPC ......... G10L 15/01; G10L 15/02; G10L 15/06; G10L 15/26; G10L 15/10; G10L 15/18; G06F 17/211; G06F 17/24; G06F 17/27; G06F 17/273; G06F 17/274; G06F 17/2745; G06F 17/21
USPC .......................... 704/235, 236, 243, 246, 238
See application file for complete search history.

(56) References Cited

U.S. PATENT DOCUMENTS

| | | | |
|---|---|---|---|
| 5,870,700 A * | 2/1999 | Parra ...................... | G06F 17/274 704/10 |
| 6,360,237 B1 * | 3/2002 | Schulz ..................... | G10L 15/22 704/231 |

(Continued)

OTHER PUBLICATIONS

Daelemans et al., "TiMBL: Tilburg Memory-Based Learner", Version 6.3, Reference Guide, May 31, 2010.*

*Primary Examiner* — Martin Lerner
(74) *Attorney, Agent, or Firm* — Ice Miller LLP (57) ABSTRACT

Language dictation recognition systems and methods for using the same. In at least one exemplary system for analyzing verbal records, the system comprises a database capable of receiving a plurality of verbal records, the verbal record comprising at least one identifier and at least one verbal feature and a processor operably coupled to the database, where the processor has and executes a software program. The processor being operational to identify a subset of the plurality of verbal records from the database, extract at least one verbal feature from the identified records, analyze the at least one verbal feature of the subset of the plurality of verbal records, process the subset of the plurality of records using the analyzed feature according to at least one reasoning approach, generate a processed verbal record using the processed subset of the plurality of records, and deliver the processed verbal record to a recipient.

19 Claims, 8 Drawing Sheets (51) Int. Cl.
*G10L 15/18* (2013.01)
*G06F 17/21* (2006.01)
*G06F 17/27* (2006.01)
*G01L 15/00* (2006.01)

(56) References Cited

U.S. PATENT DOCUMENTS

| | | | | |
|---|---|---|---|---|
| 6,834,264 B2 * | 12/2004 | Lucas | ................ | G06F 3/167 704/235 |
| 8,032,372 B1 * | 10/2011 | Zimmerman et al. | ........ | 704/235 |
| 8,286,071 B1 * | 10/2012 | Zimmerman et al. | ........ | 704/235 |
| 8,370,352 B2 * | 2/2013 | Lita | ................ | G06F 17/30616 704/4 |
| 8,428,932 B2 * | 4/2013 | Ross | ................ | G06F 17/289 704/9 |
| 8,914,278 B2 * | 12/2014 | Zangvil et al. | ................ | 704/9 |
| 2002/0143533 A1 * | 10/2002 | Lucas | ................ | G06F 3/167 704/235 |
| 2003/0046350 A1 * | 3/2003 | Chintalapati | ................ | G10L 15/26 709/206 |
| 2003/0130843 A1 * | 7/2003 | Ky | ................ | 704/235 |
| 2003/0167169 A1 * | 9/2003 | Lewis et al. | ................ | 704/260 |
| 2004/0102971 A1 * | 5/2004 | Lipscher et al. | ................ | 704/236 |
| 2005/0114129 A1 * | 5/2005 | Watson et al. | ................ | 704/235 |
| 2006/0149551 A1 * | 7/2006 | Ganong | ................ | G10L 15/22 704/270.1 |
| 2006/0149558 A1 * | 7/2006 | Kahn | ................ | G10L 15/063 704/278 |
| 2008/0201130 A1 * | 8/2008 | Peters | ................ | G06F 17/27 704/9 |
| 2010/0250236 A1 * | 9/2010 | Jagannathan | ................ | G10L 15/26 704/9 |

\* cited by examiner

SYSTEM AND METHOD FOR ANALYZING VERBAL RECORDS OF DICTATION USING EXTRACTED VERBAL FEATURES

PRIORITY

The present application is related to, and claims the priority benefit of, International Patent Application Ser. No. PCT/US2011/054857, filed Oct. 5, 2011, which is related to, and claims the priority benefit of, U.S. Provisional Patent Application Ser. No. 61/389,836, filed Oct. 5, 2010. The contents of each of these applications are hereby incorporated by reference in their entirety into this disclosure.

BACKGROUND

The transfer of verbal dictation to a concise written format is an integral part of business in many parts of society. For instance, due to the increasing amounts of audio medical records, the medical transcription industry is currently estimated to be a multibillion dollar industry. With the steady increase in size and complexity of healthcare and the desire to minimize costs associated with routine practices, there is a large push to automate routine practices, such as dictation and automatic speech recognition (ASR).

The final documents generated by transcription services differ greatly from the initial ASR output due to a number of inherent problems. Briefly, in addition to problems with the doctor's speech and common ASR problems (e.g., disfluencies, omission of function words, and wrong word guesses), there are conventions used in the final document which are generally not dictated (e.g., section headings, preamble, enumerated lists, medical terminology, and various pieces of additional structure). Traditional ASR has not focused on some of these issues, which are extremely important in fields such as medical transcription that have a specific format and high degree of specialization.

BRIEF SUMMARY

The disclosure of the present application provides various systems for analyzing and processing verbal records and methods of using and performing the same. In at least one embodiment, an exemplary system is operable to analyze medical dictation and process the analyzed form into a textual format.

In at least one embodiment of a system for analyzing verbal records to provide a desired outcome, the system comprises a database capable of receiving a plurality of verbal records, the verbal record comprising at least one identifier and at least one verbal feature, and a processor operably coupled to the database, the processor having and executing a software program. The processor is operational to identify a subset of the plurality of verbal records from the database, extract at least one verbal feature from the identified verbal records, analyze the at least one extracted verbal feature, process the subset of the plurality of records using at least one analyzed feature according to at least one reasoning approach, generate a processed verbal record using the processed subset of the plurality of records, and deliver the processed verbal record to a recipient.

Additionally, the at least one verbal feature may comprise at least one acoustic feature, such as a waveform. The processor may further be capable of converting the verbal record into a text format, such as an XML format.

The at least one verbal feature, in an exemplary embodiment, may comprise at least one first feature selected from a group consisting of a word feature and a phonetic feature. The word feature may be selected from a group consisting of a target word and a word stem, or a combination thereof. The phonetic feature may be selected from a group consisting of a number of syllables, a syllable duration pause, duration and pitch value, or a combination thereof. Moreover, the processor may be capable of using the at least one first feature to determine a position of a punctuation feature in the subset of the plurality of verbal records and introduce the punctuation feature at the position. Further, the processor may also be able to use at least one first feature to introduce at least one heading, at least one numbered list, at least one medication list, or at least one capitalization of an identified word into the subset of the plurality of verbal records.

The at least one verbal feature, in an exemplary embodiment, may further comprise at least one second feature from the subset of the plurality of verbal records, where the at least one second feature is selected from the group consisting of a part of speech tag, a chunk parse, a target word, a word stem, a number of syllables, a syllable duration pause, a duration and pitch value, or a combination thereof. The processor may also be operational to process the subset of the plurality of records using the at least one second feature according to at least one reasoning approach. Processing of the subset of records may include the addition of a processed component to the verbal record, where the processed component may be selected from a group consisting of a period, a comma, a flagged heading, a flagged numbered list, and a capitalization change. The at least one reasoning approach may in at least one embodiment be selected from the group consisting of a heuristic heading detection algorithm, a heuristic numbered list detection algorithm, a memory-based learner using Levenshtein distance metric and a memory based learner using overlap distance metric.

According to at least one embodiment of the system for analyzing verbal records, the plurality of verbal records may have been edited, at least in part, by at least one transcriptionist.

In at least one embodiment of the system for analyzing verbal records, the system may also comprise an enrollment module capable of receiving at least one verbal expression of a participant, the enrollment module being capable of processing the at least one verbal expression to generate a candidate rating for the participant. The at least one verbal expression may be selected from the group consisting of an audio characteristic and a content characteristic. Further, the processor may additionally be capable of receiving the candidate rating and adjusting at least one parameter used to process the subset of the plurality of verbal records based on the candidate rating.

In at least one embodiment of the system for analyzing verbal records, the system may further comprise an editing device in communication with the database and/or the processor, the editing device being capable of receiving at least one processed verbal record. Moreover, the editing device may additionally be capable of accepting at least one command from a user, wherein the at least one command modifies the at least one processed verbal record.

According to at least one embodiment of the system for analyzing verbal records, the system may also comprise a connection to at least one additional processor.

According to at least one embodiment of a computer-implemented method of processing dictation, the method comprises the steps of introducing a plurality of verbal records, which may optionally have been edited, at least in part, by at least one transcriptionist, to a system for analyzing verbal records to provide a desired outcome. The system in at least one embodiment of the method of processing dictation comprises a database capable of receiving a plurality of verbal records, the verbal record comprising at least one identifier and at least one verbal feature, and a processor operably coupled to the database, the processor having and executing a software program and operational to identify a subset of the plurality of verbal records from the database, extract at least one verbal feature from identified records, analyze the at least one extracted feature, process the subset of the plurality of records using the analyzed feature according to at least one reasoning approach, generate a processed verbal record using the processed subset of the plurality of records, and deliver the processed verbal record to a recipient. The method of processing dictation may also comprise the steps of modifying the identified subset of the plurality of verbal records with the system to create a modified verbal record, wherein the system uses the at least one analyzed verbal feature and at least one reasoning approach to generate the modified verbal record, and delivering the modified verbal record to a recipient.

In at least one embodiment of a computer-implemented method of processing dictation, the processor may be capable of extracting at least acoustic feature, and converting the verbal record into a text format, such as XML format. The processor may additionally be capable of extracting one first feature from the subset of the plurality of verbal records, where the at least one first feature is selected from a group consisting of a target word, a word stem, a number of syllables, a syllable duration, a pause duration, and pitch value, or a combination thereof. Further, the processor may also be capable of using the at least one first feature to determine a position of a punctuation feature in the subset of the plurality of verbal records and to introduce the punctuation feature at the determined position. Additionally, the processor may be capable of using the at least one first feature from the at least one verbal record to introduce at least one heading, at least one numbered list, and at least one capitalization of an identified word into the at least one verbal record.

In at least one embodiment of a computer-implemented method of processing dictation, the processor may be capable of extracting at least one second feature from the at least one verbal record, the at least one second feature selected from the group consisting of a part of speech tag, a chunk parse, a target word, a word stem, a number of syllables, a syllable duration pause, a duration and pitch value, or a combination thereof. The step of modifying the identified subset of verbal records may include processing of the subset of records through the use of the at least one first feature or second feature to include the addition of a processed component to the verbal record, where the processed component (such as a period, a comma, a flagged heading, a flagged numbered list, and a capitalization change) selected from a group consisting of a period, a comma, and a capitalization change. The at least one reasoning approach may in at least one embodiment be selected from the group consisting of a heuristic heading detection algorithm, a heuristic numbered list detection algorithm, a memory-based learner using Levenshtein distance metric and a memory based learner using overlap distance metric.

In at least one embodiment of a computer-implemented method of processing dictation, the method may further comprise the step of receiving at least one verbal expression from a participant and processing the at least one verbal expression to generate a candidate rating for the participant. Moreover, a computer-implemented method of processing dictation may additionally comprise the step of adjusting at least one parameter used to process the verbal record based on the candidate rating.

BRIEF DESCRIPTION OF THE DRAWINGS

The features and advantages of the present disclosure, and the manner of attaining them, will be more apparent and better understood by reference to the following descriptions taken in conjunction with the accompanying figures, wherein.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

At least one embodiment of the present disclosure is a system for analyzing and processing verbal records, where the system comprises a verbal record repository capable of storing at least one verbal record that comprises at least one feature. The system for analyzing and processing verbal records further comprises a verbal cue processing system in communication with the verbal record repository, where the verbal cue processing system is operable to retrieve at least one verbal record, and process at least one feature of the verbal record according to a reasoning approach to generate at least one processed verbal record.

I. System for Analyzing Verbal Records

Figure 1:
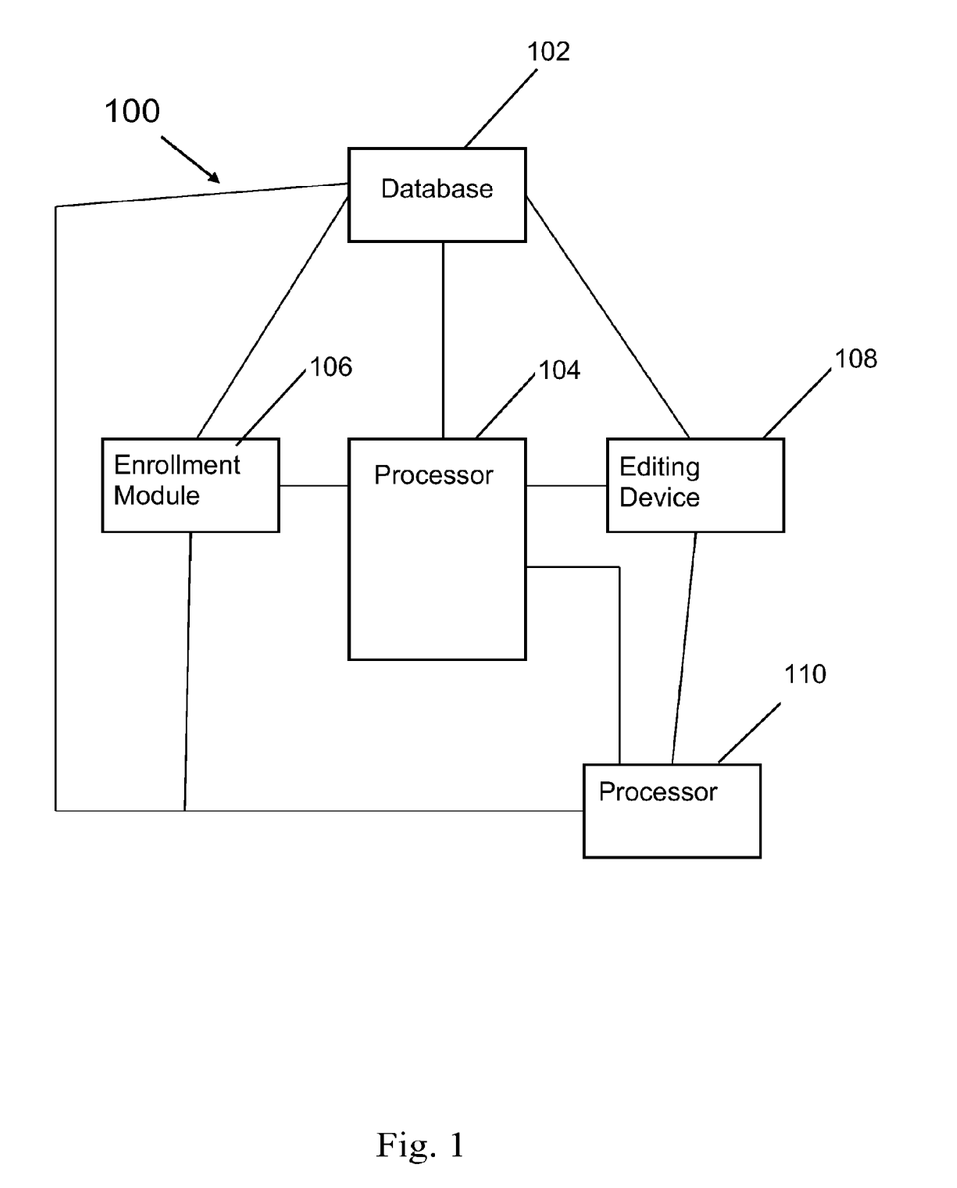
FIG. 1 shows a schematic drawing of an exemplary embodiment of a system for analyzing verbal records, according to the present disclosure.

Turning to FIG. 1, at least one embodiment of a system for analyzing verbal records to provide a desired outcome is depicted. The system 100 comprises a database 102 capable of receiving a plurality of verbal records, where the verbal records comprise at least one identifier and at least one verbal feature, and a processor 104 operably coupled to the database 102. The processor has and executes a software program operational to (1) identify a subset of the plurality of verbal records from the database, (2) analyze the at least one verbal feature of the subset of the plurality of verbal records, (3) process the subset of the plurality of records using the analyzed feature according to at least one reasoning approach, (4) generate a processed verbal record using the processed subset of the plurality of records, and (5) deliver the processed verbal record to a recipient.

In at least one embodiment of system 100, the system is capable of identifying a subset of the plurality of verbal records using processor 104. The identification method may in at least one exemplary embodiment use at least one identifier and/or at least one verbal feature to identify a subset of the verbal records. An exemplary embodiment of an identifier in a verbal record may comprise one or more of a name, date, time of record, word count, reference identification number, owner, or other identifying reference suitable to distinguish the verbal record in a database. Further, an exemplary identifier may also comprise one or more of a bar code, serial number, or radio-frequency identification (RFID).

System 100, in at least one embodiment, may be capable of analyzing a verbal feature, such as at least one acoustic feature, at least one first feature, and/or at least one second feature from the at least one verbal record. The at least one acoustic feature may, for example, be a waveform. An exemplary at least one first feature may be selected from a group consisting of a word feature, such as a target word, a word stem, or combination thereof, or a phonetic feature, such as a number of syllables, a syllable duration pause, duration and pitch value, or a combination thereof. An exemplary at least one second feature may be selected from a group consisting of a part of speech tag, a chunk parse target word, a word stem, a number of syllables, a syllable duration pause, and duration and pitch value, or a combination thereof.

Additionally, system 100 may be capable of using the at least one first feature and/or second feature to determine a position of a punctuation feature in the subset of the plurality of verbal records and introduce the punctuation feature at a determined position. Further, system 100 may also be able to use at least one first feature to introduce at least one heading, at least one numbered list, at least one medication list, and/or at least one capitalization of an identified word into the subset of the plurality of verbal records.

The system 100 may also be operational to process the subset of the plurality of records using at least one first feature and/or at least one second feature according to at least one reasoning approach. The at least one reasoning approach may in at least one embodiment be selected from the group consisting of (1) a heuristic heading detection algorithm, (2) a heuristic numbered list detection algorithm, (3) a memory-based learner using a Levenshtein distance metric, and (4) a memory based learner using an overlap distance metric.

According to at least one embodiment of the system for analyzing verbal records of the present disclosure, the plurality of verbal records may have been previously edited, for example by at least one transcriptionist.

In an exemplary embodiment of the system for analyzing verbal records of the present disclosure, the system may also comprise an enrollment module 106 capable of receiving at least one verbal expression of a participant and processing the at least one verbal expression to generate a candidate rating for the participant. The at least one verbal expression may be selected from the group consisting of an audio characteristic and a content characteristic. Further, the processor may additionally be capable of receiving the candidate rating and adjusting at least one parameter used to process the subset of the plurality of verbal records based on the candidate rating.

In at least one embodiment of the system for analyzing verbal records, the system may further comprise an editing device 108 in communication with the processor 104 (and optionally database 102), the editing device 108 being capable of receiving at least one processed verbal record from processor 104. Moreover, the editing device 108 may also be capable of accepting at least one command from a user, wherein the at least one command modifies the at least one processed verbal record.

According to at least one embodiment of the system for analyzing verbal records, the system 100 may also comprise a connection to at least one additional processor 110 capable of receiving a processed verbal record or other information, monitoring one or more aspect of system 100, and introducing commands or other information to system 100. In at least one exemplary embodiment, each of components 102-110 of system 100 may be operably coupled.

II. Computer-Implemented Method of Processing Dictation

At least one embodiment of the present disclosure is a computer-implemented method of processing dictation, where the method comprises the steps of introducing at least one verbal record to an embodiment of a system for analyzing and processing verbal records, generating at least one processed verbal record with the system for analyzing and processing verbal records, and providing the at least one processed verbal record to a computer in communication with the verbal cue processing system.

Figure 2:
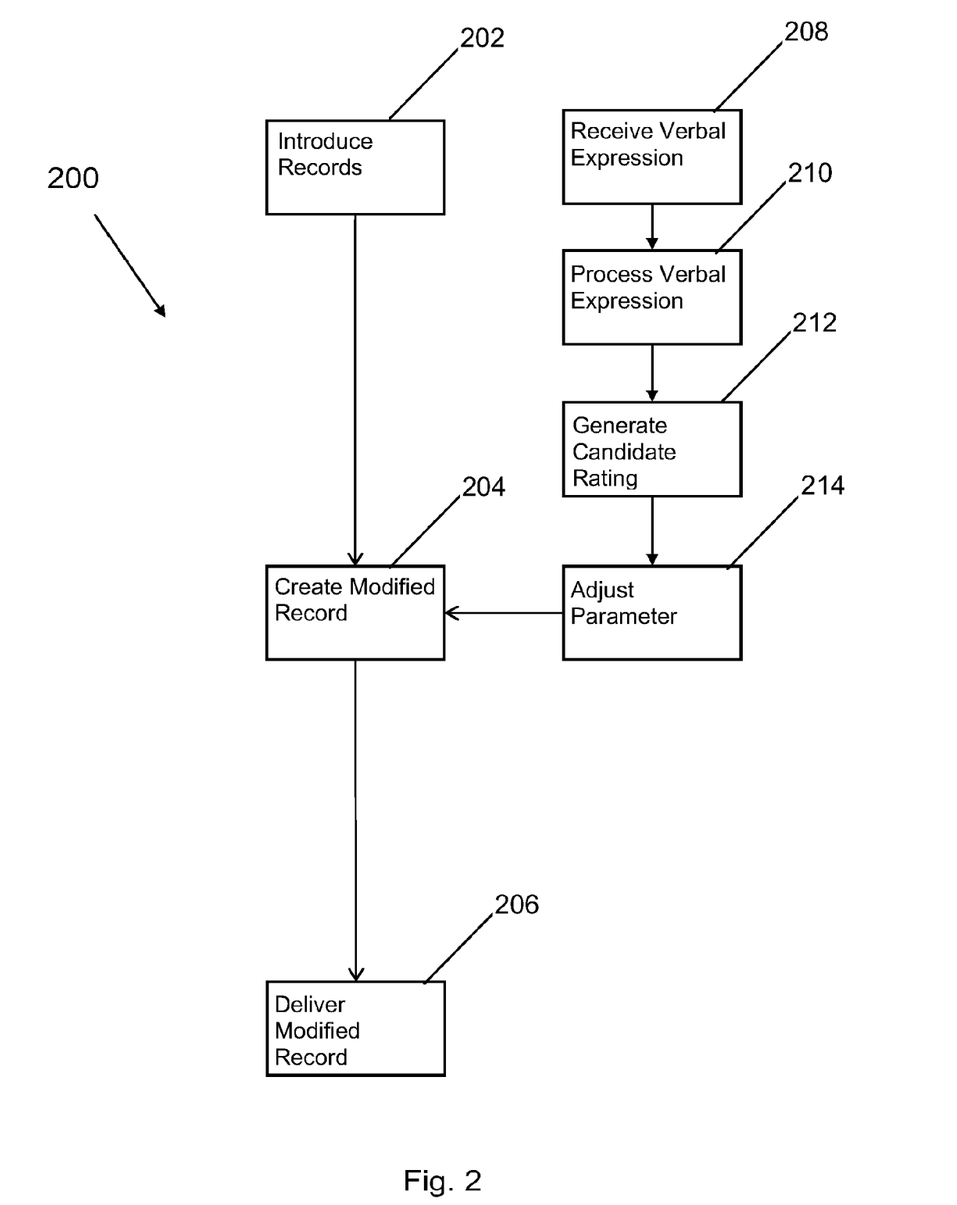
FIG. 2 shows a flowchart of at least one embodiment of a computer-implemented method of processing dictation, according to the present disclosure.
Figure 8:
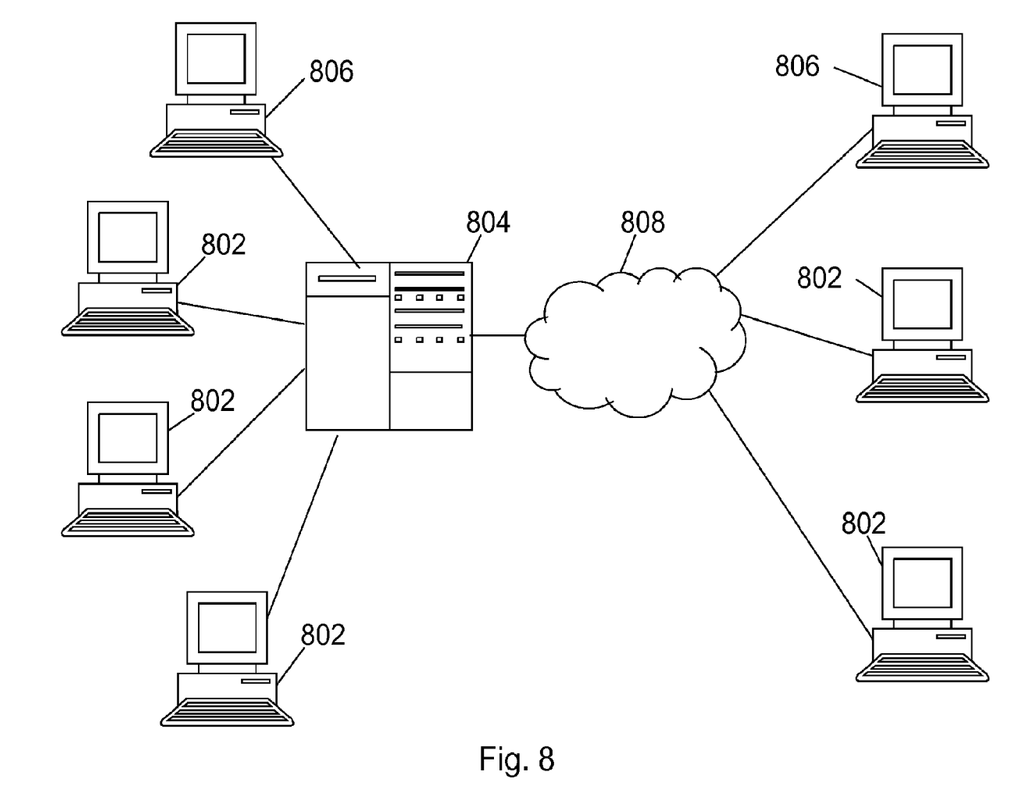
FIG. 8 shows an exemplary system framework according to an embodiment of the present disclosure.

Turning to FIG. 2, at least one embodiment of a computer-implemented method of processing dictation 200 is depicted. Exemplary method 200 comprises the steps of introducing a plurality of verbal records, which may optionally have been, at least in part, edited by at least one transcriptionist, to an embodiment of a system for analyzing verbal records of the present disclosure to provide a desired outcome (exemplary introducing step 202). The method of processing dictation 200 may also comprise the steps of modifying the identified subset of the plurality of verbal records with the system to create a modified verbal record (exemplary modifying step 204), wherein the system uses the at least one analyzed verbal feature and at least one reasoning approach to generate the modified verbal record, and delivering the modified verbal record to a recipient (exemplary delivering step 206). In an exemplary embodiment of delivering step 206, the modified verbal record may be delivered through any appropriate electronic means (such as through an aspect of system 800 as seen in FIG. 8) to a recipient (such as for example, a medical professional, database user, or a transcriptionist).

In at least one embodiment of a computer-implemented method of processing dictation 200, the method 200 may further comprise the step of receiving at least one verbal expression from a participant (exemplary receiving step 208) and processing the at least one verbal expression (exemplary processing step 210) to generate a candidate rating for the participant (exemplary generating step 212). Moreover, the method 200 may additionally comprise the step of adjusting at least one parameter used to process the verbal record based on the candidate rating (exemplary adjusting step 214). The candidate rating and at least one parameter produced by method 200 may be stored in at least one embodiment of database 102.

In at least one embodiment of a computer-implemented method of processing dictation 300 (See FIG. 3), the processor may be capable of identifying and extracting at least one first feature from the subset of the plurality of verbal records (exemplary identifying step 302), where the at least one first feature is selected from a group consisting of a target word, a word stem, a number of syllables, a syllable duration, a pause duration, and pitch value, or a combination thereof. Further, the processor may also be capable of using the at least one first feature to determine a position of a punctuation feature in the subset of the plurality of verbal records (exemplary determining step 304) and to introduce the punctuation feature at the determined position (exemplary introducing step 306). Additionally, the processor may be capable of using the at least one first feature from the at least one verbal record to introduce at least one heading, at least one numbered list, and at least one capitalization of an identified word into the at least one verbal record.

Figure 3:
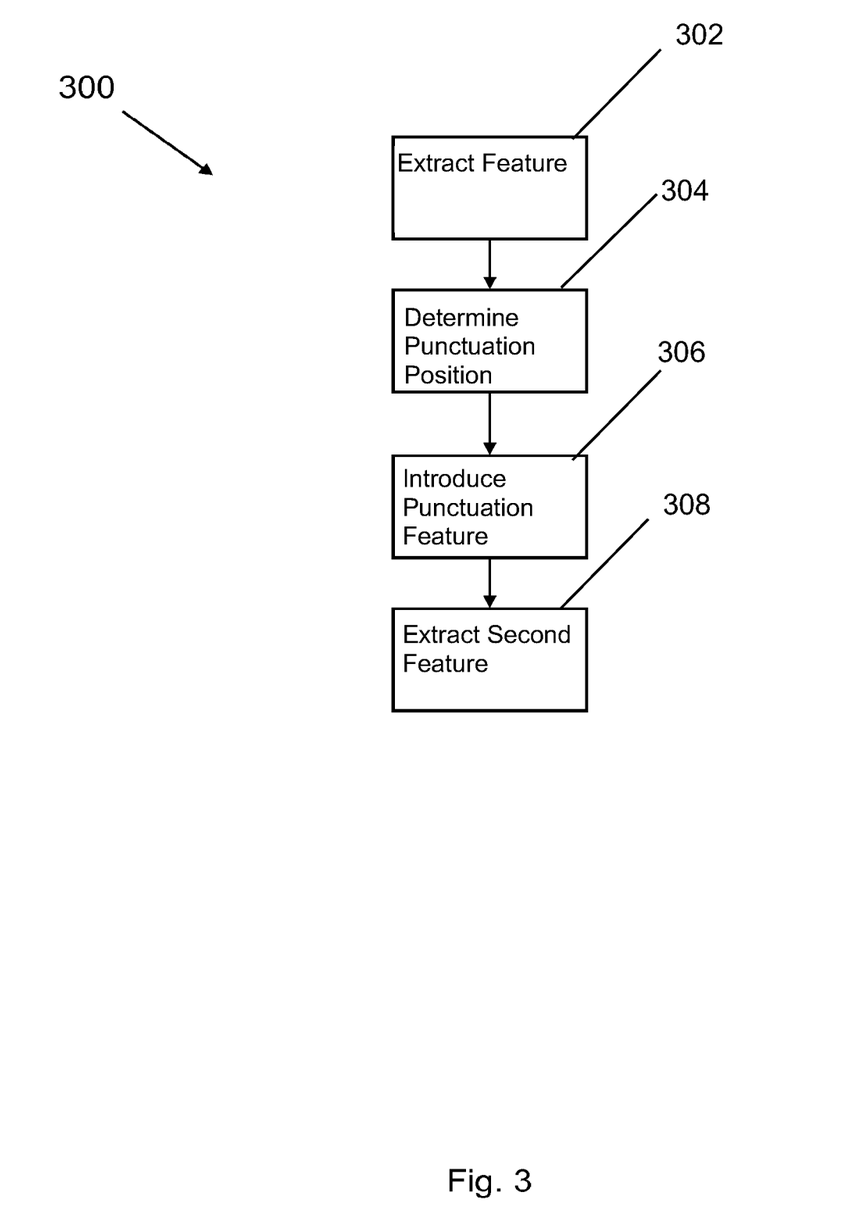
FIG. 3 shows a flowchart of at least one embodiment of a computer-implemented method of processing dictation, according to the present disclosure.

In at least one embodiment of a computer-implemented method of processing dictation 300, the processor may be capable of extracting at least one second feature from the at least one verbal record (exemplary extracting step 308), the at least one second feature selected from the group consisting of a part of speech tag, a chunk parse, a target word, a word stem, a number of syllables, a syllable duration pause, a duration and pitch value, or a combination thereof.

III. Aspects of Systems and Methods

A. Verbal Records

A plurality of verbal records according to an exemplary embodiment of the present disclosure may comprise any type of verbal recording or translation to text thereof. For example, a plurality of verbal records may contain any number of unprocessed verbal recordings, verbal recordings processed through an automatic speech recognition engine, or a copy of any one of the verbal recordings described herein translated into a text format. Further, a plurality of verbal records may include sets of verbal records designated for training and/or a set of verbal recordings designated for evaluation purposes.

Figure 4:
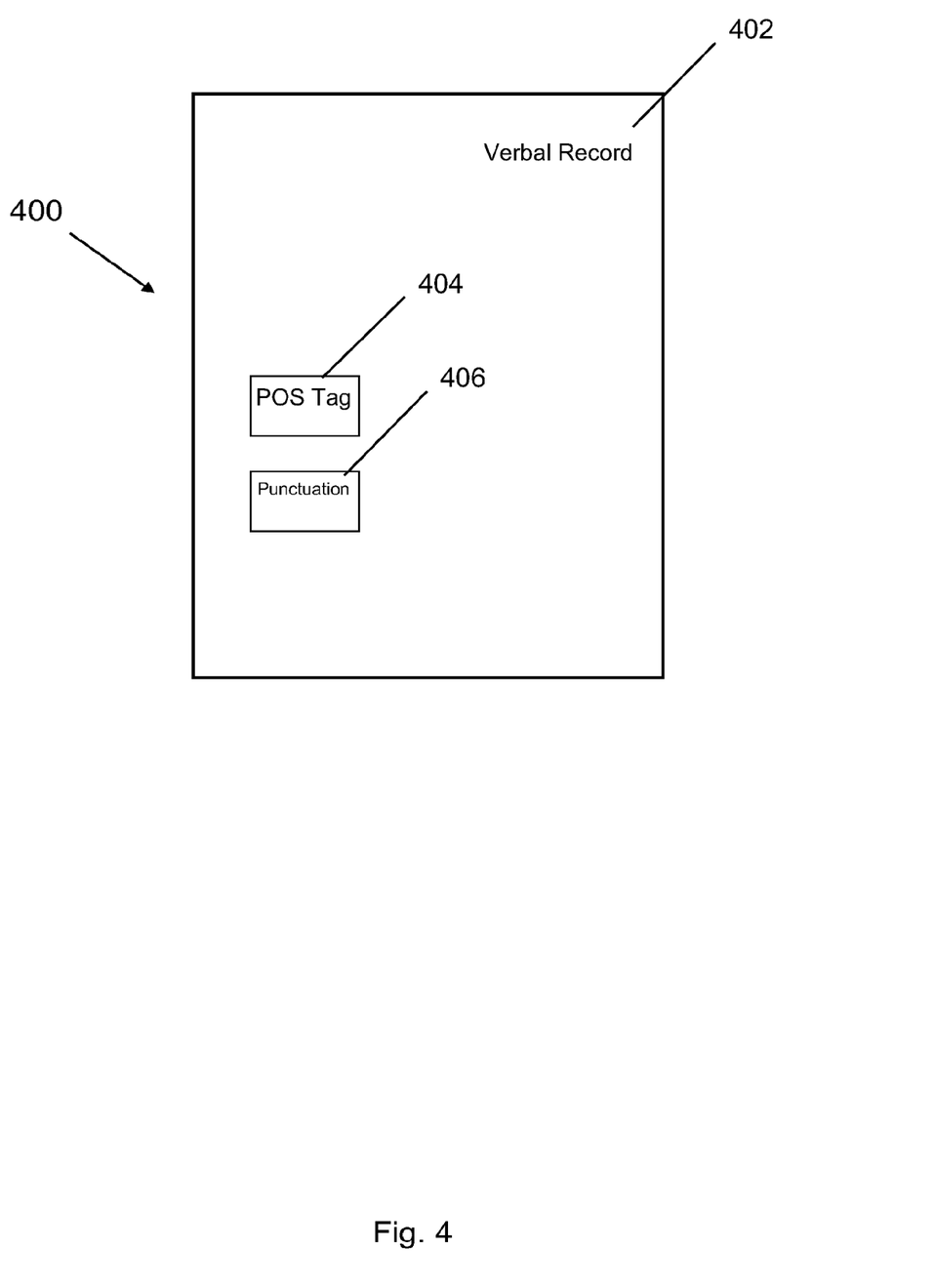
FIG. 4 shows a schematic drawing of an exemplary embodiment of a system for analyzing verbal records, according to the present disclosure.

Turning to FIG. 4, exemplary verbal records 402, of an embodiment of a system for analyzing verbal records 400, designated, or amended, for training according to an embodiment of the present disclosure may include one or more part-of-speech (POS) tag 404. Further, the verbal records 402 may additionally comprise punctuation 406, such as commas and periods. In at least one embodiment, verbal records 402 labeled for training may be processed (such as by embodiments of a system of the present disclosure) in duplicate with only one copy of the duplicate record being processed to include punctuation. For a first training record of feature instances, according to an embodiment of the present disclosure, features can simply be extracted from the post-regular expression (regex) file. For the second training record, the same post-regex file may be used as in the first training record, followed by processing with a POS tagger, a chunk parser, and then the extraction of appropriate features.

B. Format

According to at least one embodiment of the present disclosure, the verbal record may be translated using an embodiment of a system for analyzing verbal records of the present disclosure. The translated record may in some instances be compared and/or aligned to a translation performed by one or more transcriptionist. In at least one embodiment, the translated record from an embodiment of the system and/or method of analyzing verbal records as described herein is in XML format.

C. Regular Expression Matching

Figure 5:
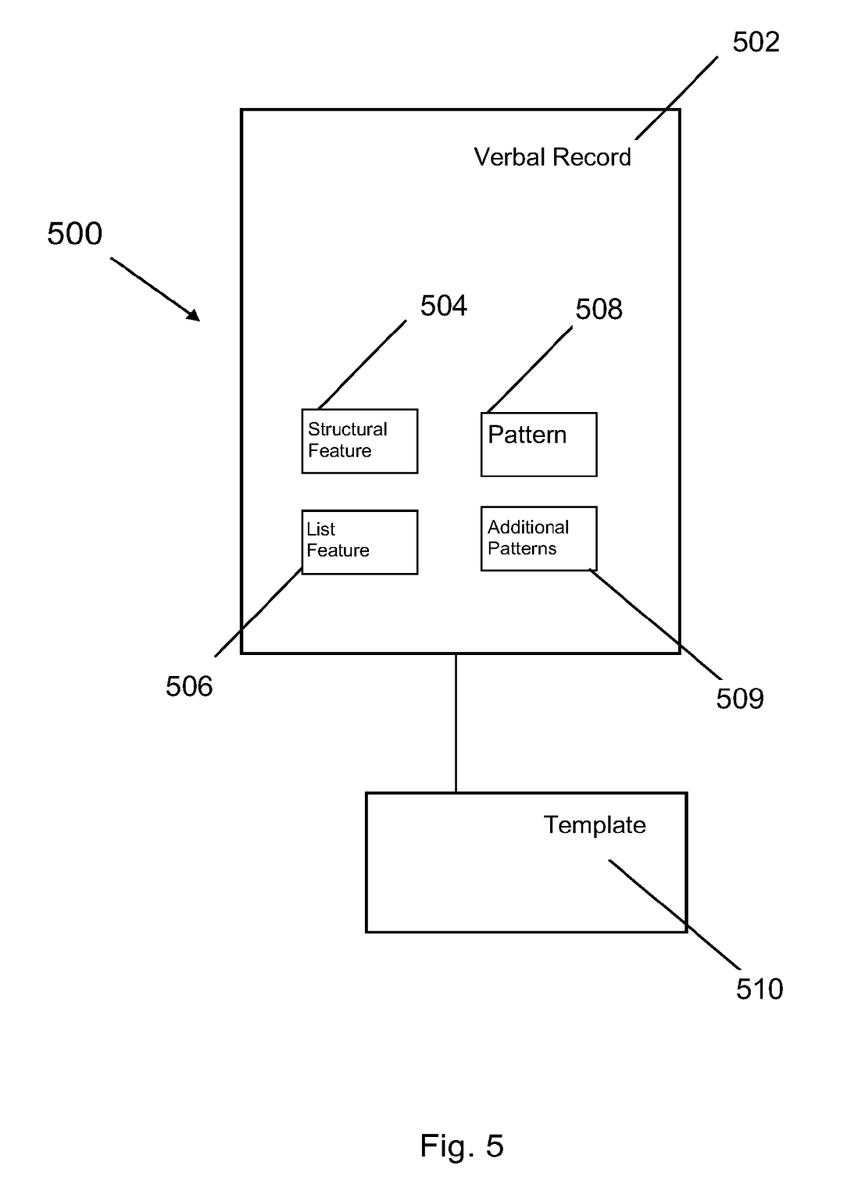
FIG. 5 shows a schematic drawing of an exemplary embodiment of a system for analyzing verbal records, according to the present disclosure.

In at least one embodiment of a system for analyzing verbal records 500, as seen in FIG. 5, the system 500 may be capable of processing a subset of verbal records 502 through modification of the verbal (or text translated) record 502 by adding or subtracting a structural feature 504 or a list feature 506. The processor of an embodiment of a system for analyzing verbal records may look for at least one pattern 508. Exemplary patterns 508 according to the present disclosure may include information such as punctuation, headings, medical or legal terms, numbers, quantity indicators, frequencies, durations, and indications of a number.

The verbal record 502 from which at least one pattern 508 is identified may be modified to indicate the presence of a pattern 508 and the location within the verbal record 502 of the pattern 508. Additionally, the at least one pattern 508 may be used singly, or in combination with additional patterns 509, to identify the location of a structural feature 504 or list feature 506. Further, the at least one pattern 508 may be used in combination with a template 510 or library of templates to determine the appropriate structural feature or list feature for use with the applicable verbal record 502.

Figure 6:
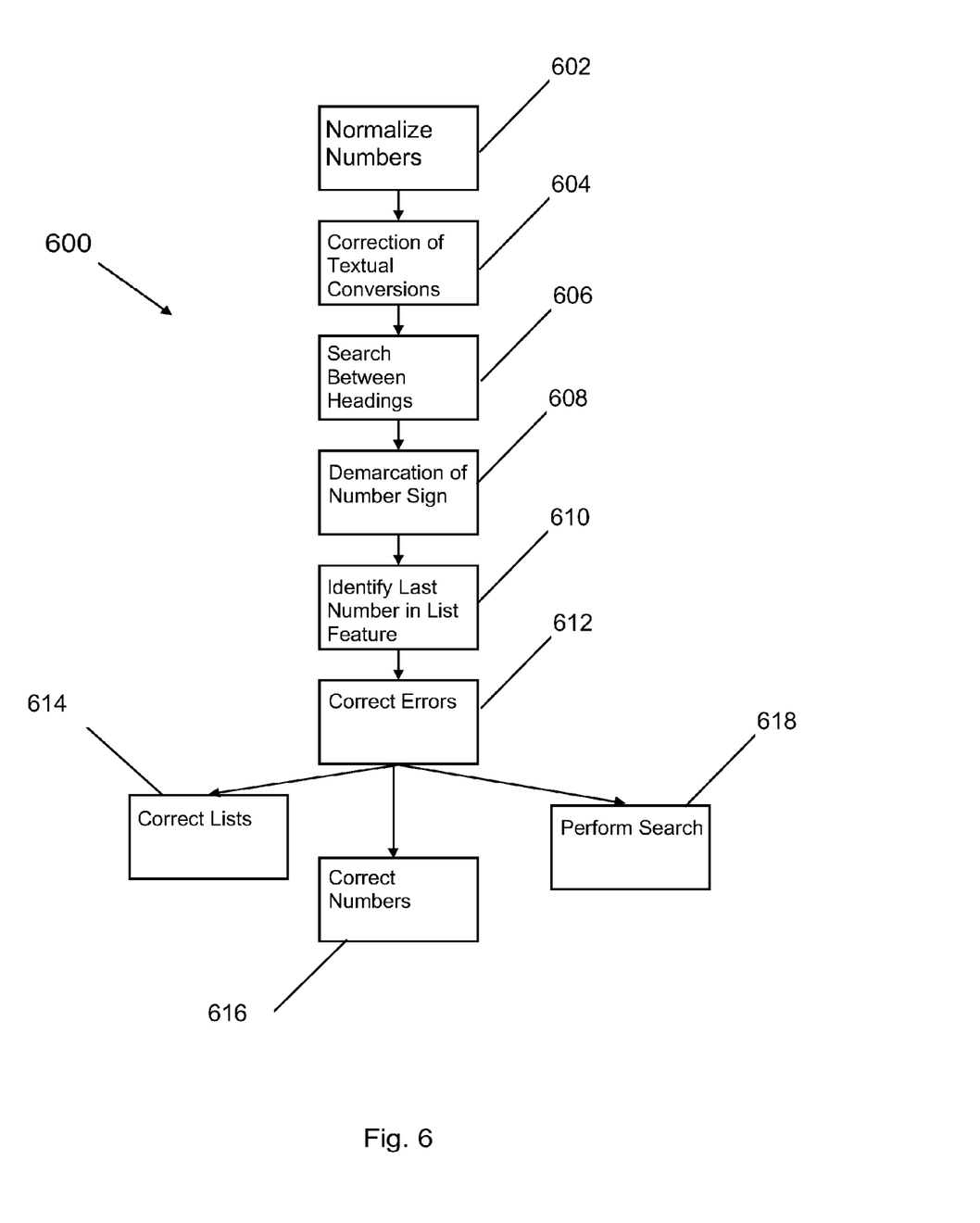
FIG. 6 shows a flowchart of at least one embodiment of a computer-implemented method of processing dictation, according to the present disclosure.

Turning to FIG. 6, an embodiment of a verbal record having a verbal feature identifying a list feature, may be adapted to incorporate the list feature, in an embodiment of a method for analyzing verbal records 600 of the present disclosure. The steps in the adaption method may include normalizing some or all of the identified numbers into a common format (such as one to 1) (exemplary normalizing step 602), correction of simple textual conversions 604 (such as #for to #4) (exemplary correction step 604), searching between headings to a numerical indicator (# or number) followed by a number (exemplary searching step 606). Following the identification of a numerical indicator followed by a number, the first number sign may be demarked as the beginning of a list (exemplary demarcation step 608) and the last identified number in the list feature is identified as the end of the list (exemplary identifying step 610). Following the identification of the list, errors are corrected in at least one exemplary embodiment (exemplary correction step 612).

Exemplary embodiments of method 600 may also comprise one or more additional modification steps 614-618. First, lists which do not start with "1" are corrected (exemplary correction step 614). Second, numbers which are missing from the normal progression identified in the list are added where missing (exemplary adding step 616). Lastly, a search may be performed between the end of the list and the next identified structural feature (such as a heading) (exemplary searching step 618).

In an exemplary embodiment of a method of the present disclosure, medication lists as found in at least one verbal record are identified by searching the record between identified headings to find the number of times that a medication, a quantity, or a frequency is detected. In at least one embodiment, if there is at least one medication present between headings, along with one or more frequency or quantity, then a medication list is designated.

D. Feature Extraction

According to at least one aspect of a verbal feature of the present disclosure, the verbal feature may be a word feature or a phonetic feature, such as those included in Table 1. In an exemplary embodiment, a word feature may include a target word and/or a word stem, and a phonetic feature may include a defined number of syllables, a syllable duration ratio (calculated by dividing the duration of the word by the number of syllables), pause duration (the pause between a target word and the next word), and a pitch value. For at least one embodiment, the pitch (F0) value may be determined between every 5 milliseconds and 20 milliseconds, such as about every 10 milliseconds. From the F0 measurements, variables are determined, which include the (1) maximum F0 of the target, (2) minimum F0 of the target, (3) the change in F0 (delta F0) between the previous word to the target word, and (4) the F0 change at the final boundary of each word (boundary F0)

TABLE 1

Features

| Feature Number | Feature Name |
|---|---|
| 1-5 | The window of 5 words |
| 6-10 | POS |
| 11-15 | Stems |

TABLE 1-continued

| Features | |
|---|---|
| Feature Number | Feature Name |
| 16 | The number of syllables in the 3rd word |
| 17 | The ratio 3rd word's syllable duration to the average of the previous 10 |
| 18 | The pause duration after the 3rd word |
| 19 | The difference between the MaxF0 of the 2nd word and the 3rd word (DeltaF0) |
| 20 | The Maximum F0 of the 3rd word |
| 21 | The Minimum F0 of the 3rd word |
| 22 | The F0 change in the 3rd word boundary |
| 23 | The number of syllables in the 4th word |
| 24 | The ratio of 4th word's syllable duration to the average of the previous 10 |
| 25 | Delta F0 of the 4th word |
| 26 | Max F0 of the 4th word |
| 27 | does this line have chunk information: yes |
| 28 | does this line start with a shallow-level chunk: nx |
| 29 | does this line start with a deep-level chunk: nx |
| 30 | does this line end with a shallow-level chunk: no |
| 31 | does this line end with a deep-level chunk: no |
| 32 | The presence of punctuation after the 3rd word (class) |

1-15: Words, POS, Stems

Features 1-5 are illustratively five (5) word windows that are looked at for each instance In at least one embodiment of a system of method of the present disclosure, an instance may be an identified subset of verbal records. Features 6-10 and 11-15 are the part of speech (POS) tags and stems of the same five words, respectively. The POS may tell how the word is used, i.e. verb, noun, adjective, etc. The stems are the roots of the words with any suffixes removed from the ends. For example, should the actual point of possible punctuation be between words 3 and 4, so it may be expected that words closer to that will be more important to the processor in making its decisions. In such an example, features 1, 5, 11, and 15, may be ignored so that the system may only need to consider the POS of the words at either end of the window. In at least one embodiment, feature 7 may be ignored as well as the POS of the second word, feature 13, and the stem of the third word. Only for the fourth word, the word after the target for punctuation, all of the "word" features are considered. The same combinations are used for each of the features in all three of the tests in Table 2.

16-26: Phonetic Features

The phonetic features may be broken down into two categories: those that deal with speech rate, and those that deal with fundamental frequency (F0) or tone. In at least one specific embodiment, all of these features deal with either the 3rd word (features 16-22) or the 4th word (23-26) in the window. Generally, the same combinations for these features are used regardless of which training method is being employed for a given test with one illustrative exception. Feature 16, the number of syllables in the third word, may be ignored in either case, as are 20-21, the maximum and minimum F0 for the third word. These features, in at least one embodiment, may be extracted for the purpose of constructing other features, namely features 17 and 19 (technically, the minimum F0 was not needed for feature 19). For the "LODO-trained" tests feature 23 was also ignored. For the "self-trained" tests, feature 26 was again ignored.

27-31: Syntactic Features

In an exemplary embodiment, features 27-31 may provide an embodiment of the processor with syntactic information about the instance in question. All of these aforementioned features may prove to be useful in all testing conditions.

E. Formatting

Figure 7:
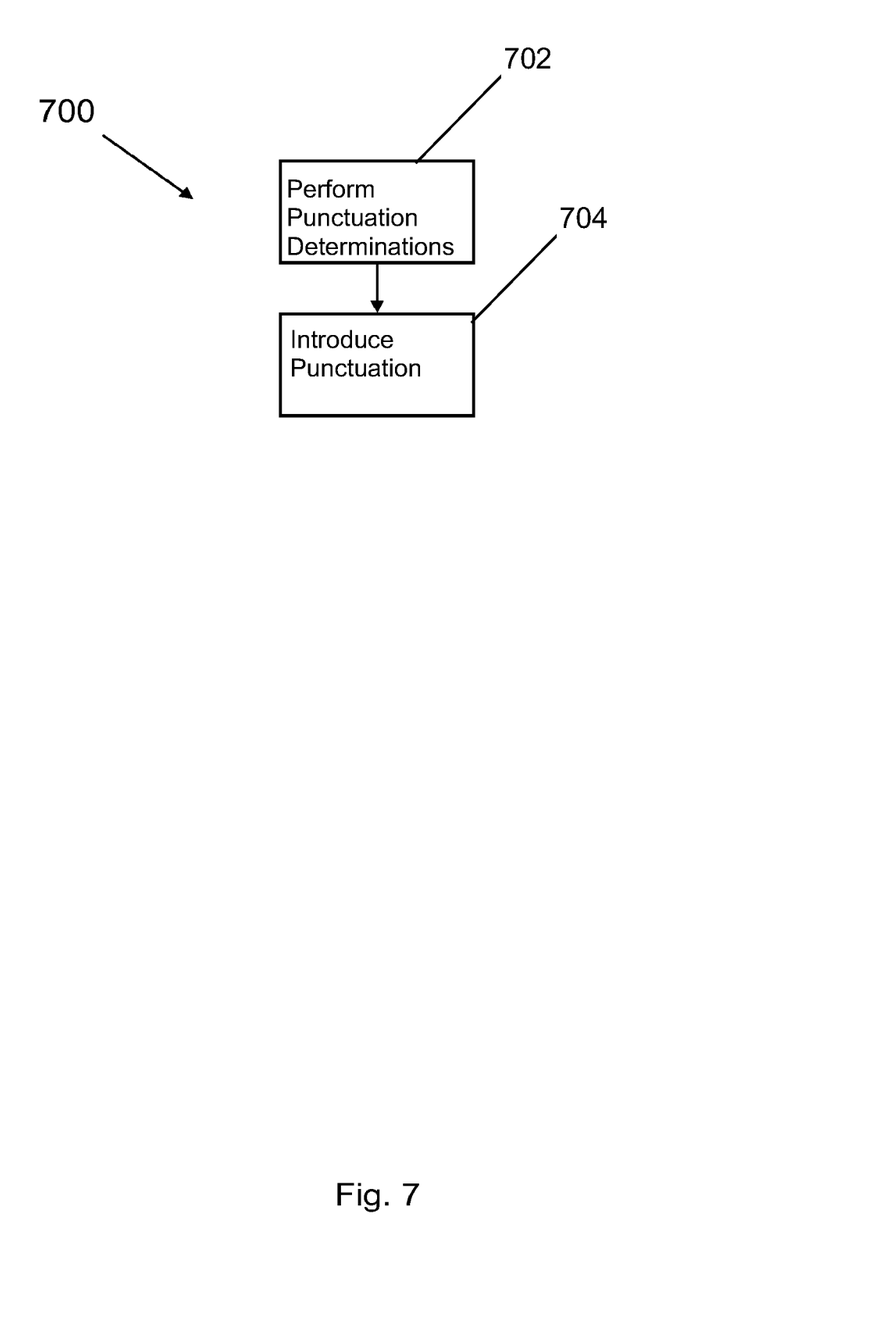
FIG. 7 shows a flowchart of at least one embodiment of a computer-implemented method of processing dictation, according to the present disclosure.

According to at least one embodiment of the method of processing dictation 700 according to the present disclosure (See FIG. 7), initial punctuation and formatting determinations are made (exemplary determination step 702). Following the determination of POS tags and chunks, according to at least one embodiment, an initial punctuation is introduced (exemplary introduction step 704).

An exemplary computer-implemented method of processing dictation 200 may be used in several different technology and service areas. For example, exemplary method 200 may be used in healthcare applications, such as medical dictation, legal transcription, automatic real-time voice translation, call routing, voice dialing, and content-based audio search.

The various systems of the present disclosure may operate on a computer network with one or more of the features shown in FIG. 8. As shown in exemplary system framework 800 shown in FIG. 8, one or more user computers 802 may be operably connected to a system server 804. A user computer 802 may be a computer, computing device, or system of a type known in the art, such as a personal computer, mainframe computer, workstation, notebook computer, laptop computer, hand-held computer, wireless mobile telephone, personal digital assistant device, and the like.

One or more administrator computers 806 may also be operably connected to system server 804 including through a network 808 such as the Internet. Administrator computers 806, similar to user computers 802, may be computers, computing devices, or systems of a type known in the art, such as a personal computers, mainframe computers, workstations, notebook computers, laptop computers, hand-held computers, wireless mobile telephones, personal digital assistant devices, and the like. In addition, user computers 802 and administrator computers 806 may each comprise such software (operational and application), hardware, and componentry as would occur to one of skill of the art, such as, for example, one or more microprocessors, memory, input/output devices, device controllers, and the like. User computers 802 and administrator computers 806 may also comprise one or more data entry means (not shown in FIG. 8) operable by a user of client computer and/or an administrator computer, such as, for example, a keyboard, keypad, pointing device, mouse, touchpad, touchscreen, microphone, and/or other data entry means known in the art. User computers 802 and administrator computers 806 also may comprise an audio display means (not shown in FIG. 8) such as one or more loudspeakers and/or other means known in the art for emitting an audibly perceptible output. The configuration of user computers 802 and administrator computers 806 in a particular implementation of one or more systems of the present disclosure is left to the discretion of the practitioner.

System server 804 may comprise one or more server computers, computing devices, or systems of a type known in the art. System server 804 may comprise server memory. System server 804 may comprise one or more components of solid-state electronic memory, such as random access memory. System server 804 may also comprise an electromagnetic memory such as one or more hard disk drives and/or one or more floppy disk drives or magnetic tape drives, and may comprise an optical memory such as a Compact Disk Read Only Memory (CD-ROM) drive. System server 804 may further comprise such software (operational and application), hardware, and componentry as would occur to one of skill of the art, such as, for example, microprocessors, input/output devices, device controllers, video display means, and the like.

System server 804 may comprise one or more host servers, computing devices, or computing systems configured and programmed to carry out the functions allocated to system server 804. System server 804 may be operated by, or under the control of, a "system operator," which may be an individual or a business entity. For purposes of clarity, system server 804 is shown in FIG. 8 and referred to herein as a single server. System server 804 need not, however, be a single server. System server 804 may comprise a plurality of servers or other computing devices or systems connected by hardware and software that collectively are operable to perform the functions allocated to the various systems of present disclosure. Specifically, system server 804 may be operable to be a web server, configured and programmed to carry out the functions allocated to a system server according to the present disclosure. Further, although user computers 802 and administrator computers 806 may be connected directly to system server 804, these computers may be connected to system server 804 through any suitable network such as network 808. Further, in one embodiment, the users need not be provided access to system server 804 but instead the content posts from users are made by the user(s) and saved to one or more particular locations and the posts are accessed or harvested by the administrator or system automatically.

System server 804 may be operably connected to the various user computers 802 and/or an administrator computers 806 by network 808, which in an embodiment of the present disclosure comprises the Internet, a global computer network. However, network 808 need not comprise the Internet. Network 808 may comprise any means for electronically interconnecting system server 804 and a user computer 802 and/or an administrator computer 806. Thus, it will be appreciated by those of ordinary skill in the art that the network 808 may comprise the Internet, the commercial telephone network, one or more local area networks, one or more wide area networks, one or more wireless communications networks, coaxial cable, fiber optic cable, twisted-pair cable, the equivalents of any of the foregoing, or the combination of any two or more of the foregoing. In an embodiment where system server 804 and user computer 802 and/or an administrator computer 806 comprise a single computing device operable to perform the functions delegated to both system server 804 and user computer 802 and/or an administrator computer 806 according to the present disclosure, network 808 comprises the hardware and software means interconnecting system server 804 and user computer 802 and/or an administrator computer 806 within the single computing device. Network 808 may comprise packet switched facilities, such as the Internet, circuit switched facilities, such as the public switched telephone network, radio based facilities, such as a wireless network, etc.

The various systems, methods, schema, ontologies, and architectures of the present disclosure may be used for purposes outside of the medical transcription field as referenced in the various examples cited herein. For example, the system for analyzing verbal records may comprise various components and relationships suitable for use in any number of areas where various experiences are utilized and processed, with feedback being fed back into system componentry to improve overall system outcomes. In addition, various components described herein may share a name (or a portion thereof) but have duplicative reference numbers, and therefore the descriptions for the various components should read in view of one another.

In addition, and regarding the various systems of the present disclosure, such systems may be operable, as desired by a user of such systems, to generate visual, electronic (video, audio, database, transcript, etc.), and/or printed reports, outputs, outcomes, and the like. Such exemplary outputs may be used for any number of purposes, and may be useful generally to "report" results, data, and/or knowledge contained within and generated from such systems. Furthermore, the disclosure of the present application further encompasses uses of the various methods, systems, architectures, etc., to perform various tasks in connection therewith.

While various embodiments of systems for analyzing verbal records and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

EXAMPLE

TABLE 2

| | | Individual Results by Test | | | | | | | |
|---|---|---|---|---|---|---|---|---|---|
| | | Test 1[a] | | | Test 2[b] | | | Test 3[c] | | |
| | | Recall | Precision | F-Score | Recall | Precision | F-Score | Recall | Precision | F-Score |
| | Subject A | 31.12 | 70.59 | 56.29 | 28.57 | 94.11 | 64.50 | 25.00 | 93.33 | 60.33 |
| | Subject B | 27.81 | 72.95 | 55.06 | 25.00 | 75.00 | 53.55 | 30.55 | 84.61 | 62.47 |
| | Subject C | 34.80 | 83.85 | 65.38 | 27.27 | 91.30 | 62.10 | 24.67 | 100.00 | 62.06 |
| | Subject D | 25.03 | 93.10 | 60.28 | 53.84 | 87.50 | 77.77 | 46.15 | 90.00 | 75.61 |
| | Subject E | 41.97 | 94.30 | 75.46 | 42.85 | 94.73 | 76.25 | 40.47 | 94.44 | 74.53 |
| | Subject F | 38.47 | 84.54 | 68.20 | 25.71 | 100.00 | 63.36 | 20.00 | 87.50 | 52.23 |
| | Subject G | 37.09 | 96.84 | 73.21 | 51.28 | 90.90 | 78.72 | 33.33 | 92.85 | 68.39 |
| | Subject H | 21.62 | 77.23 | 50.97 | 57.92 | 89.07 | 80.40 | 50.81 | 92.07 | 79.20 |
| | Subject I | 40.27 | 92.75 | 73.56 | 64.77 | 89.06 | 82.84 | 53.40 | 95.91 | 82.73 |

TABLE 2-continued

Individual Results by Test

|  | Test 1[a] | | | Test 2[b] | | | Test 3[c] | | |
| --- | --- | --- | --- | --- | --- | --- | --- | --- | --- |
|  | Recall | Precision | F-Score | Recall | Precision | F-Score | Recall | Precision | F-Score |
| Subject J | 26.03 | 73.70 | 53.92 | 50.00 | 88.23 | 76.51 | 53.33 | 88.88 | 78.39 |
| Subject K | 38.39 | 95.64 | 73.64 | 38.09 | 100.00 | 75.46 | 33.33 | 77.77 | 61.39 |
| Subject L | 42.30 | 90.16 | 73.50 | 18.75 | 81.81 | 48.87 | 16.66 | 88.88 | 47.58 |
| Subject M | 46.81 | 91.77 | 76.69 | 65.00 | 86.66 | 81.23 | 63.75 | 91.07 | 83.87 |
| Mean Avg | 34.74 | 85.95 | 65.87 | 42.23 | 89.87 | 70.88 | 37.80 | 90.56 | 68.36 |

[a]LODO-training with settings: -mO: I1,5,7,11,13,15-16,20-21,23,30-k9-dID
[b]self-trained with settings: -mO: I1,5,7,11,13,15-16,20,21,26,30-k9-dID
[c]self-trained with settings: -mL: I1,5,7,11,13,15-16,20,21,26,30-k9-dID Table 2 provides results for all doctors for three different tests. One utilizing the overlap metric and "LODO-training" in the first column, one using overlap and "self-training" in column two, and the final combines "self-training" with Levenshtein Distance. The table shows the recall, precision, and precision-weighted f-score, in percentages, for all doctors for each test, as well as the combined results for each test. These results reflect the at least one settings for each type of test on our data to date.

When considering which settings may optimize transcription results, the tests in Table 2 will be referred to. It is possible to get better results for a single doctor at a time with different combinations of settings and features. The default settings of the IB1 nearest neighbor algorithm and Gain Ratio feature weighting have proven to be the best settings for all tests we have run to this point. The decision about the global metric for this dataset, despite the range of options available to an embodiment of the processor, is essentially binary: overlap or Levenshtein Distance. These two metrics can both produce acceptable results, depending on a number of factors. The metric is controlled using the −mivċ (in this case the value should be either L for Levenshtein Distance or O for overlap) in the command line call. The amount of training data available/employed in the test should be considered when making this decision. Generally for our data, overlap performs better with large amounts of training data, whereas Levenshtein can perform well with smaller or larger amounts. Another potentially important factor is time. Running identical tests, changing only the metric as in tests 2 and 3 from Table 2, overlap tests will go much faster than Levenshtein.

Levenshtein Distance can produce the best results for some doctors, and overlap for others. As you can see in Table 2, doctors A, D, E, F, G, H, and K have better results for the overlap tests, but Doctors B, J, and M have better results in the Levenshtein test. For some doctors, the difference is negligible, but for doctors like F and B, there is quite a difference.

What is claimed is:

1. A system for analyzing verbal records to improve a textual transcript, the system comprising:
   a database capable of receiving a plurality of verbal records, each verbal record in the plurality of verbal records comprising at least one identifier and at least one phonetic feature, each of the at least one phonetic feature comprising at least one first feature selected from the group consisting of a number of syllables, a syllable duration pause, duration and pitch value, or a combination thereof; and
   a processor operably coupled to the database, the processor having and executing a software program and operational to:
   identify a subset of the plurality of verbal records from the database;
   extract at least one phonetic feature from the identified verbal records;
   analyze the at least one extracted phonetic feature;
   process the subset of the plurality of records using the at least one analyzed phonetic feature according to at least one reasoning approach;
   further process the subset of the plurality of records using the at least one first feature to determine a position of a punctuation feature in each verbal record in the subset of the plurality of verbal records and introduce the punctuation feature at the position, the punctuation feature being a comma;
   generate a processed verbal record using the processed subset of the plurality of records; and
   deliver the processed verbal record to a recipient.

2. The system of claim 1, wherein the processor is capable of converting the verbal record into a text format.

3. The system of claim 1, wherein the processor is capable of using the at least one first feature to introduce at least one medication list into the subset of the plurality of verbal records.

4. The system of claim 1, wherein the at least one phonetic feature further comprises at least one second feature selected from the group consisting of a part of speech tag, a chunk parse, a number of syllables, a syllable duration pause, a duration and pitch value, or a combination thereof.

5. The system of claim 4, wherein the processor is operational to process the subset of the plurality of records using the at least one first feature and the at least one second feature according to at least one reasoning approach.

6. The system of claim 4, wherein the processor is operational to process the subset of the plurality of records using the at least one second feature according to at least one reasoning approach.

7. The system of claim 6, wherein the processing of the subunit of the plurality of records adds a processed component to the at least one verbal record, the processed component selected from a group consisting of a period, a comma, and a capitalization change.

8. The system of claim 6, wherein the at least one reasoning approach is selected from a group consisting of a memory-based learner using a Levenshtein distance metric and a memory based learner using an overlap distance metric.

9. The system of claim 1, wherein the system further comprises an enrollment module capable of receiving at least one verbal expression of a participant, the enrollment module being capable of processing the at least one verbal expression to generate a candidate rating for the participant;

wherein the processor is capable of receiving the candidate rating and adjusting at least one parameter used to process the subset of the plurality of verbal records based on the candidate rating.

10. The system of claim 1, further comprising an editing device in communication with the database, the editing device capable of receiving at least one processed verbal record;
wherein the editing device is capable of accepting at least one command from a user, wherein the at least one command modifies the at least one processed verbal record.

11. A computer-implemented method of processing dictation, the method comprising the steps of:
introducing a plurality of verbal records to a system for analyzing verbal records to improve a textual transcript, the system comprising:
a database capable of receiving a plurality of verbal records, each verbal record comprising at least one identifier and at least one phonetic feature, each of the at least one phonetic featuring comprising at least one first feature selected from the group consisting of a number of syllables, a syllable duration pause, duration and pitch value, or a combination thereof; and
a processor operably coupled to the database, the processor having and executing a software program and operational to:
identify a subset of the plurality of verbal records from the database;
extract at least one phonetic feature from the subset of the plurality of verbal records;
analyze the at least one phonetic feature of the subset of the plurality of verbal records;
process the subset of the plurality of records using the analyzed feature according to at least one reasoning approach;
further process the subset of the plurality of records using the at least one phonetic feature to determine a position of a punctuation feature in each verbal record in the subset of the plurality of verbal records and introduce the punctuation feature at the position, the punctuation feature being a comma;
generate a processed verbal record using the processed subset of the plurality of records;
deliver the processed verbal record to a recipient;
modifying the identified subset of the plurality of verbal records with the system to create a modified verbal record, wherein the system uses the at least one analyzed phonetic feature and the at least one reasoning approach to generate the modified verbal record; and
delivering the modified verbal record to the recipient.

12. The method of claim 11, wherein the processor is capable of converting the verbal record into a text format.

13. The method of claim 11, wherein the processor is capable of using the at least one first feature to introduce at least one numbered list into the subset of the plurality of verbal records.

14. The method of claim 11, wherein the processor is capable of using the at least one first feature to introduce at least one medication list into the subset of the plurality of verbal records.

15. The method of claim 11, wherein the at least one phonetic feature further comprises at least one second feature selected from the group consisting of a part of speech tag, a chunk parse, a number of syllables, a syllable duration pause, a duration and pitch value, or a combination thereof.

16. The method of claim 11, wherein the system further comprises an enrollment module operably coupled to the processor, the enrollment module capable of receiving at least one verbal expression of a participant, the enrollment module being capable of processing the at least one verbal expression to generate a candidate rating for the participant.

17. The method of claim 16, wherein the processor is capable of receiving the candidate rating and adjusting at least one parameter used to process the subset of the plurality of verbal records based on the candidate rating.

18. The method of claim 11, further comprising an editing device in communication with the database, the editing device capable of receiving at least one processed verbal record;
wherein the editing device is capable of accepting at least one command from a user, wherein the at least one command modifies the at least one processed verbal record.

19. The method of claim 11, wherein the processor is further configured to process the subset of the plurality of records using the at least one first feature to determine a second position of a second punctuation feature in each verbal record in the subset of the plurality of verbal records and introduce the second punctuation feature at the second position, the second punctuation feature being a heading.

* * * * *